(12) United States Patent
Korn et al.

(10) Patent No.: US 10,938,430 B2
(45) Date of Patent: Mar. 2, 2021

(54) DISTRIBUTED ANTENNA WITH CLOSED-LOOP IMPEDANCE MATCHING FOR HIGH SPEED VEHICLES

(71) Applicant: The Charles Stark Draper Laboratory, Inc., Cambridge, MA (US)

(72) Inventors: Jeffrey Korn, Lexington, MA (US); Steven J. Byrnes, Watertown, MA (US); Baturalp R. Arslan, Lexington, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 0 days.

(21) Appl. No.: 16/376,280

(22) Filed: Apr. 5, 2019

(65) Prior Publication Data

US 2019/0312607 A1 Oct. 10, 2019

Related U.S. Application Data

(60) Provisional application No. 62/653,057, filed on Apr. 5, 2018.

(51) Int. Cl.
| | |
|---|---|
| *H04B 1/3822* | (2015.01) |
| *H01Q 1/28* | (2006.01) |
| *H04B 7/0404* | (2017.01) |
| *H04B 5/00* | (2006.01) |

(52) U.S. Cl.
CPC ............ *H04B 1/3822* (2013.01); *H01Q 1/28* (2013.01); *H04B 5/0043* (2013.01); *H04B 7/0404* (2013.01)

(58) Field of Classification Search
CPC .. H04B 1/3822; H04B 5/0043; H04B 7/0404; H04B 1/0458; H04B 1/18; H04B 7/04; H04B 17/00; H01Q 1/28; H01Q 1/286
See application file for complete search history.

(56) References Cited

U.S. PATENT DOCUMENTS

| | | | |
|---|---|---|---|
| 3,570,789 A | 3/1971 | Rainey | |
| 3,758,862 A * | 9/1973 | Tevelow | ................. H04B 7/00 455/64 |

(Continued)

OTHER PUBLICATIONS

Choi, C.Q., "New Spaceship Antenna Prevents Radio Silence During Fiery Re-Entry," Space.com, 1-4 (2015).
Gao, X., et al., "A Matching Approach to Communication Through the Plasma Sheath Surrounding a Hypersonic Vehicle," Journal of Applied Physics, 117: 233301-1-233301-5 (2015).

(Continued)

*Primary Examiner* — Lewis G West
(74) *Attorney, Agent, or Firm* — HoustonHogle LLP

(57) ABSTRACT

A communication system for a hypersonic vehicle uses a distributed antenna system, an impedance matching circuit that provides impedance matching between a transmitter and/or receiver and the selected one or more antennas of the distributed antennas system and a surrounding plasma sheath, near-field probes to determine impedance of the plasma sheath adjacent to each of the probes and thus predict behavior of the respective antennas near the probes, and a control system that selectively connects a transmitter and/or receiver to one or more of the antennas based upon the antennas that are seeing the most favorable transmission or reception characteristics and controlling the impedance matching is to provide impedance matching for the selected antennas.

16 Claims, 3 Drawing Sheets

(56) References Cited

U.S. PATENT DOCUMENTS

| | | | | |
|---|---|---|---|---|
| 4,005,366 | A * | 1/1977 | Poirier | G09B 9/00 |
| | | | | 455/115.1 |
| 4,811,028 | A * | 3/1989 | Bryanos | H01Q 13/0275 |
| | | | | 343/705 |
| 5,039,992 | A * | 8/1991 | Lenormand | H01Q 1/002 |
| | | | | 343/700 MS |
| 5,689,275 | A * | 11/1997 | Moore | H01Q 3/2676 |
| | | | | 343/772 |
| 5,755,400 | A * | 5/1998 | Kalms, III | F41G 7/343 |
| | | | | 244/3.17 |
| 7,839,916 | B1 * | 11/2010 | Luecke | G01S 19/37 |
| | | | | 375/147 |
| 9,306,527 | B1 * | 4/2016 | Hively | G06F 30/20 |
| 9,972,907 | B2 * | 5/2018 | Stratis | H01Q 1/281 |
| 2008/0205538 | A1 * | 8/2008 | Han | H04L 1/20 |
| | | | | 375/267 |
| 2012/0149411 | A1 * | 6/2012 | Miyoshi | H04B 7/0413 |
| | | | | 455/501 |
| 2017/0054482 | A1 * | 2/2017 | Forenza | H04B 7/0626 |

OTHER PUBLICATIONS

Gillman, E.D., et al., "Review of Leading Approaches for Mitigating Hypersonic Vehicle Communications Blackout and a Method of Ceramic Particulate Injection Via Cathode Spot Arcs for Blackout Mitigation," NASA/TM, 1-19 (2010).

Kundrapu, M., et al., "Electromagentic Wave Propagation in the Plasma Layer of a Reentry Vehicle," Proceedings of ICOPS/BEAMS, 1-4 (2014).

Osborne, H., "Hypersonic Flight Communication Blackouts Potentially Eliminated with Redesigned Antenna," Science-Space, 1-2 (2015).

Smith, N.J., "Novel Closed-Loop Matching Network Topology for Reconfigurable Antenna Applications," The Ohio State University, 1-181 (2014).

Stenzel, R.L., et al., "A New Method for Removing the Blackout Problem on Reentry Vehicles," Journal of Applied Physics, 113: 103303-1-103303-5 (2013).

Wolverton, M., "Piercing the Plasma: Ideas to Beat the Communications Blackout of Reentry," Scientitic America, 1-8 (2009).

"Maximum Power Transfer Theorem," Wikipedia, 1-5 (2018).

* cited by examiner

DISTRIBUTED ANTENNA WITH CLOSED-LOOP IMPEDANCE MATCHING FOR HIGH SPEED VEHICLES

RELATED APPLICATIONS

This application claims the benefit under 35 USC 119(e) of U.S. Provisional Application No. 62/653,057, filed on Apr. 5, 2018, which is incorporated herein by reference in its entirety.

BACKGROUND OF THE INVENTION

The blackout problem is a well-known problem that is encountered by hypersonic vehicles in the atmosphere. These hypersonic vehicles generate shockwaves. And, if traveling fast enough, these shockwaves give rise to plasma sheaths that envelop the vehicles. This problem was commonly encountered during the Apollo and space shuttle missions. During reentry, communication to the vehicles was lost for as long as tens of minutes until they slowed enough to allow the dissipation of the plasma sheaths that had blocked communication transmissions to and from the vehicles.

The mechanisms surrounding the creation of the plasma sheath are well understood. Atmospheric gases flowing by hypersonic vehicles are heated. At velocities approaching Mach 10 and higher, the heating will be so strong that the electrons will be ripped from the atoms, creating highly ionized atmospheric gases. In this ionized state, the normally insulative properties of the atmosphere are gone, resulting in highly conductive free electrons.

The plasma sheath interferes with incoming and outgoing transmissions. The plasma sheath appears almost as a metallic reflector to the antennas. As a result, the antennas, which are typically designed to couple to a vacuum or the atmosphere, are no longer operable.

A number of approaches have been proposed to enable communication transmission to and from hypersonic vehicles.

It has been proposed to shape the vehicles so that the aerodynamics minimize the thickness of the plasma sheath in the regions surrounding the antennas. The problem with this approach, however, is that the hypersonic vehicles generally operate over wide speed ranges. Thus, it is difficult to shape the aircraft such that this sheath will be thin enough in specific locations over those speed ranges. Moreover, such changes also often require compromises in the design of an aircraft, which is already operating near the design limits.

Another approach relies on the creation of magnetic windows. Since the plasma is conductive, it can be guided with magnetic fields. It has been proposed to employ strong magnets on the vehicle that will shape the plasma sheath and specifically thin it around the antennas. The problem with this approach, however, is that the systems required to generate the strong magnetic fields would contribute to the weight of the vehicle.

Still another approach is to use a quenchant such as water. This approach, however, also adds weight to the vehicle.

SUMMARY OF THE INVENTION

The present solution combines a number of separate aspects that can be used together or separately to enable unidirectional or bidirectional communication through the plasma sheath of a hypersonic vehicle.

First, a distributed switchable antenna system can be used. This involves distributing antennas over the surface of the vehicle. Then, a control system selectively connects the transmitter and/or receiver to one or more of those antennas based upon the antennas that are seeing the most favorable transmission or reception characteristics. In this way, as the characteristics of the plasma sheath change through the course of the flight, communication links can still be maintained by switching to different antenna or antennas that see favorable coupling characteristics to the plasma sheath.

In order to find those locations in the plasma sheath for the most favorable transmission or reception, a system of near-field probes is used to detect the far-field radiated power. These probes allow a control system to determine the impedance of the plasma sheath adjacent to each of the probes and thus predict behavior of the respective antennas near those probes. Often, the most favorable transmission or reception characteristics are the antennas that see the highest impedance, including resistance, to the surrounding space.

Finally, an adaptive tuning system is used that allows impedance matching between the selected antennas and the surrounding plasma sheath. In this way, the antennas can be tuned to transmit and receive through that plasma sheath.

In general, according to one aspect, the invention features a communication system for a hypersonic vehicle. The system comprises a distributed antenna system and a control system that selectively connects a transmitter and/or receiver to one or more of the antennas based upon the antennas that are seeing the most favorable transmission or reception characteristics.

In general, a number of different types of transmissions could be supported by this system. For example, the proposed system could be used to support two-way voice communications. In this case a transceiver connects to the antenna system for the two way transmissions. The propose system can also provide transmissions of data telemetry from the vehicle to a ground station. In this case, the control system connects the transmitter to the antennas. On the other hand, a data transceiver could be used for two-way communications enabling vehicle tracking. The proposed system could also be used for the reception of GPS navigation information from satellites and/or ground stations by connecting the antennas to GPS receivers on the vehicle. Finally, electronic countermeasures would be facilitated with the present system.

In embodiments, the distributed antenna system comprises antennas distributed over the hypersonic vehicle. In addition, each of the antennas might include a feed line and one or more resonators surrounding the feed line. Preferably, each of the antennas conforms to an outer surface of a surface of the hypersonic vehicle and might be on a nose portion and/or other portions of the fuselage of the hypersonic vehicle.

Preferably, an impedance matching circuit provides impedance matching between the transmitter and/or receiver and the selected one or more antennas and a surrounding plasma sheath.

The impedance match can be facilitated by near-field probes to determine impedance of a plasma sheath adjacent to each of the probes and thus predict behavior of the respective antennas near the probes.

In general, according to another aspect, the invention features hypersonic vehicle. It comprises a fuselage, a distributed antenna system comprising antennas distributed over the fuselage, and a transmitter and/or receiver. Finally, a control system selectively connects one or more of the antennas to the transmitter and/or receiver based upon the antennas that are seeing the most favorable transmission or reception characteristics with respect to a plasma sheath surrounding the vehicle.

In general, according to another aspect, the invention features a method for providing communication system for a hypersonic vehicle. The method comprises determining which antennas distributed over the hypersonic vehicle are seeing the most favorable transmission or reception characteristics and selectively connecting a transmitter and/or receiver of the hypersonic vehicle to those one or more the antennas to transmit or receive information.

In general, according to another aspect, the invention features a communication system for a hypersonic vehicle. The system comprises a distributed antenna system, an impedance matching circuit that provides impedance matching between a transmitter and/or receiver and the selected one or more antennas of the distributed antennas system and a surrounding plasma sheath, near-field probes to determine impedance of the plasma sheath adjacent to each of the probes and thus predict behavior of the respective antennas near the probes, and a control system that selectively connects a transmitter and/or receiver to one or more of the antennas based upon the antennas that are seeing the most favorable transmission or reception characteristics and controlling the impedance matching to provide impedance matching for the selected antennas.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items.

Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

How the plasma inhibits transmissions is generally well understood. The electromagnetic wave of a radio frequency (RF) transmission acts as a periodic driving force on the electrons in the plasma. If the driving frequency is considerably less than the plasma frequency of the plasma electrons, inertial effects are small and the electron will oscillate at the driving frequency. The oscillating charge acts as a dipole radiator producing both a forward traveling and a backward traveling electromagnetic wave. The backward traveling wave appears as a reflected wave while the forward traveling wave is out of phase with and tends to cancel the driving signal. The situation is completely changed when the transmission or driving frequency is much greater than the electron plasma frequency. The electron now exhibits large inertial effects and is able to oscillate only weakly at the driving frequency. As a result, the electromagnetic wave propagates with comparatively little attenuation. The principle issue then becomes impedance matching to the plasma with antennas that are typically designed to impedance match to free space.

Figure 1:
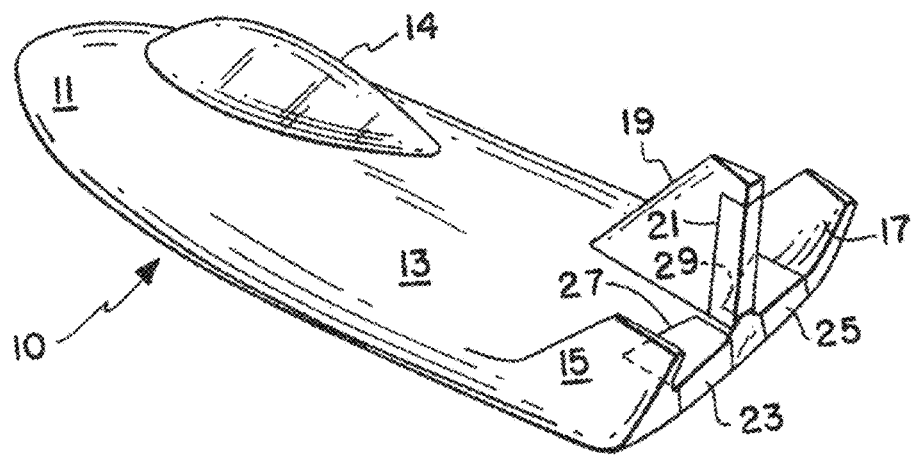
FIG. 1 is a perspective view of an exemplary hypersonic vehicle to which the present invention might be applied.

FIG. 1 shows an exemplary hypersonic vehicle 10, shown merely for the purposes of discussion. It includes a fuselage body 13, a raised canopy 14.

The fuselage 13 has a nose portion 11. On the other hand, toward the rear it has a dorsal fin 19, elevons 23 and 25, and outboard fins 15 and 17.

The illustrated hypersonic vehicle 10 is generally configured as a reentry vehicle that carries one or more occupants.

However, the present invention applies to many other types of hypersonic vehicles, FIG. 1 being only one example. These other types include vehicles with or without occupants. They also include other vehicles for reentry or vehicles for leaving the Earth's atmosphere.

Figure 2:
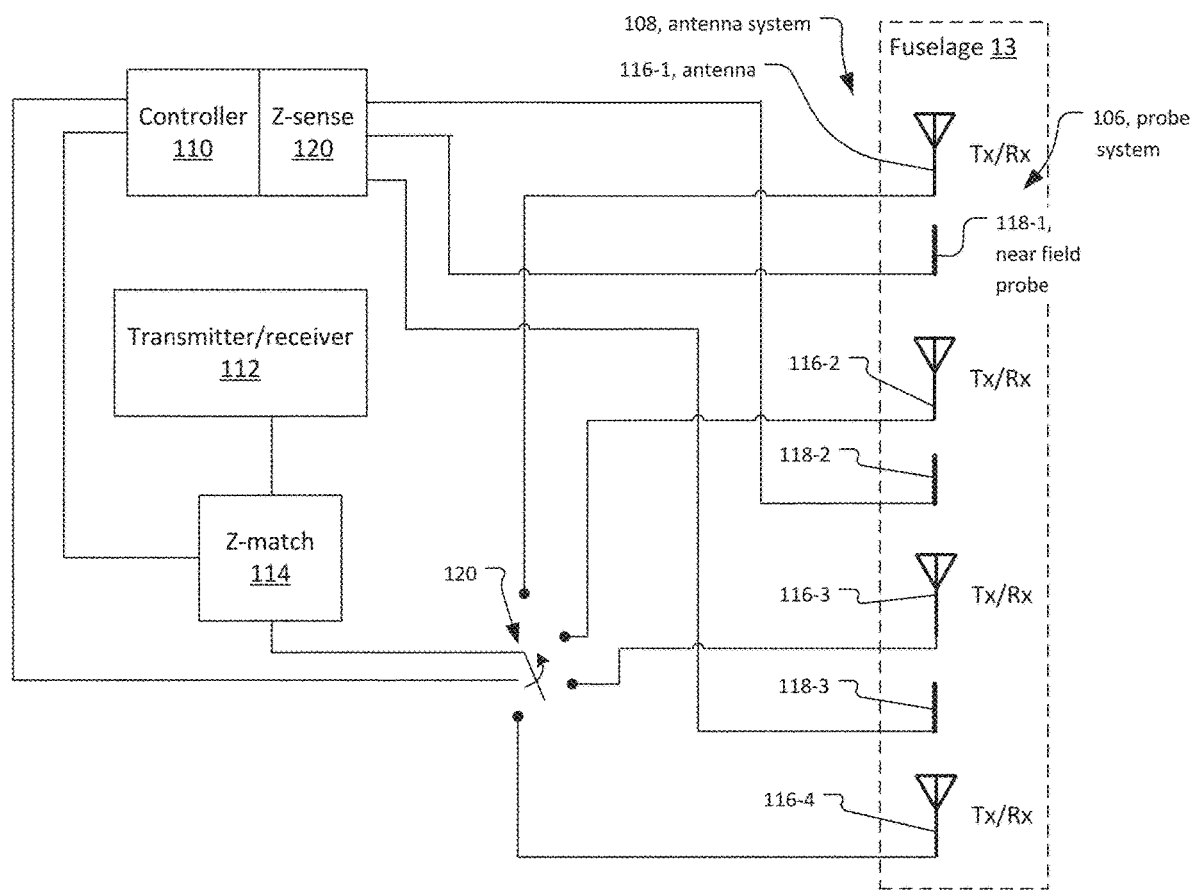
FIG. 2 is a circuit diagram of the distributed antenna system according to the present invention.

FIG. 2 is a block diagram showing a distributed antenna system 108 for the hypersonic vehicle 10 that employs impedance matching for its antennas 116 to the plasma sheath.

In more detail, the antenna system 108 comprises a series of separate antennas 116-1 to 116-n that are distributed around the fuselage 13 of the vehicle 10. In general, ten or more or possibly one hundred or more of these antennas are used in some examples. Typically, the antennas might be located on the portions of the fuselage 10 where, due to the aerodynamics, the plasma sheath will be thin or nonexistent at least during portions of the vehicle's hypersonic flight.

The distributed antennas 116 of the antenna system 108 are preferably ring resonators. They are preferably very thin and conform to the surface of the fuselage 13.

Figure 3A:
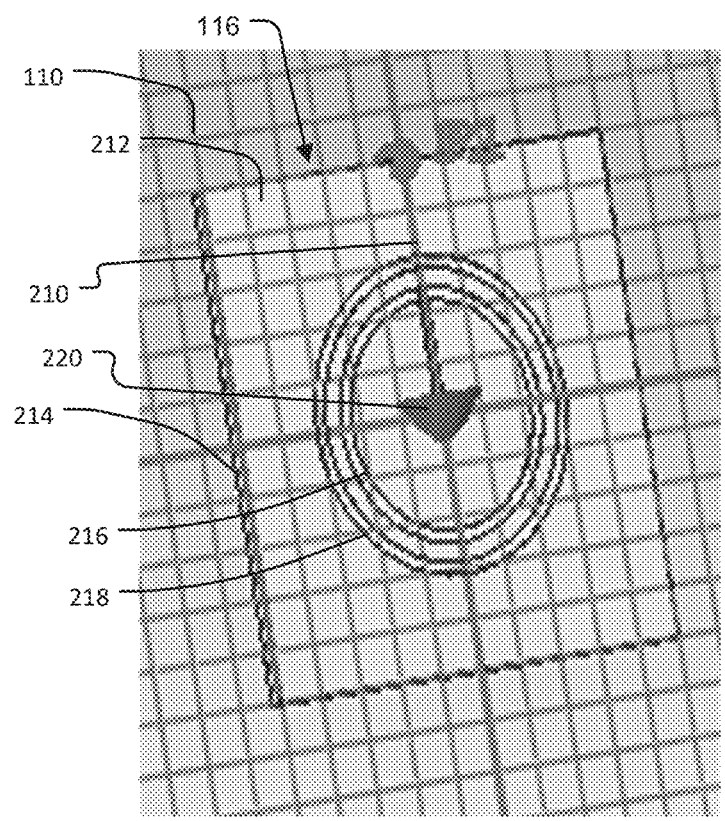
FIG. 3A shows an exemplary single feed dual ring resonator antenna that might be used.

FIG. 3A shows an exemplary embodiment of one of the distributed antennas 116.

In more details each antenna 116 comprises a single 50 Ohm coaxial feed line 210. The conductive metal feed line 210 is patterned or otherwise formed on a top surface of a square dielectric patch 212. The dielectric patch 212 in turn is located on a conductive metal ground plane patch 214 that is coextensive with the size of the dielectric patch 212.

Two concentric circular conductive metal resonators 216, 218 encircle the end 220 of the feed line 210.

Preferably each of the metal layers of the feed line 210, resonators 216, 218, and the ground plane patch 214 are thin, such as less than 0.1 millimeters thick. As a result, the metal layers along with the dielectric patch 212 form a flexible antenna assembly 116 that is conformal and can be shaped to the curve of the outer surface of the fuselage 13. Preferably separate antennas 116 are also located on different portions of the dorsal fin 19, elevons 23 and 25, and outboard fins 15 and 17.

Figure 3B:
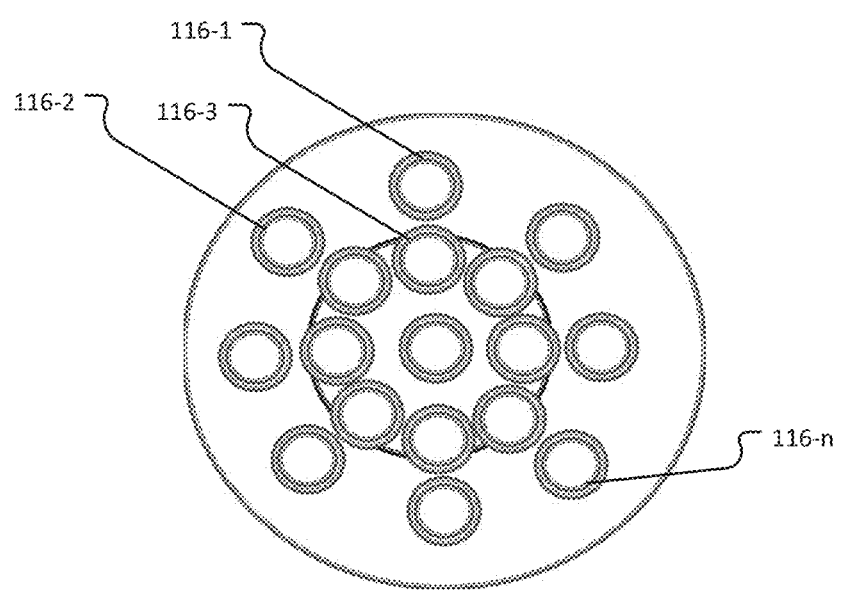
FIG. 3B shows an arrangement of the antennas.

Further, the distributed antennas 116 of the antenna system 108 might be arrayed in antenna arrays as shown in FIG. 3B. Specifically, 17 antennas 116 are arrayed in a generally circular pattern Returning back to FIG. 2, a probe system 106 uses an array of near field probes 118 that are also distributed around the surface of the fuselage 13, such as the nose portion 11, dorsal fin 19, elevons 23 and 25, and outboard fins 15 and 17. In one embodiment, each of the near field probes 118-1 to 118-$n$ is located to be adjacent to a corresponding antenna 116-1 to 116-$n$ or array of antennas of the antenna system 108. The probes are used to measure the impedance around the fuselage 13, and specifically the scattering matrix that would be encountered by each associated antennas 116. More generally, the probe system 106 is able to map out the shape of the plasma sheath, then use antennas acting collectively to aim towards thinner parts/shortest path-length.

Different designs can be employed for the near field probes. Examples in electric (E) field probes, magnetic (H) field probes or combinations of H field and E field probes. Currently, the near field probes could be designed as guided by the Dissertation entitled Novel Closed-Loop Matching Network Topology for Reconfigurable Antenna Applications by Nathanael Smith for Graduate Program in Electrical and Computer Engineering at The Ohio State University (2014) (hereinafter Dissertation).

The impedance sense module 120 detects the impedance seen by each of the near field probes 118. This information is used by a controller 110 to find the best antennas 116 or combination antennas of the antenna system 108 for transmission and/or reception. This information is used to control the switch 120. Specifically, the switch 120 connects one or more of the antennas 116 to the impedance matching circuit 114 that provides the impedance match between the transmitter and/or receiver 112 and the selected one or more antennas 116.

The impedance matching circuit 114 functions as a fast impedance matching network. It is built on the understanding that attenuation in the plasma is inevitable, but if it properly adapts and loads the antennas, it avoids additional reflections at the edge.

In general, to obtain maximum external power from the transmitter with a finite internal resistance, the resistance of the load must equal the resistance of the transmitter as viewed from its output terminals. Similarly, in circuits with reactive components, maximum power transfer occurs when the load impedance is equal to the complex conjugate of the source impedance.

Currently, the impedance matching circuit 114 in one embodiment, uses stub tuning such as the triple stub tuner. In other embodiments, the impedance match circuit 114 is the triple stub varactor loaded tuner.

Finally, the controller 110 uses the sensed impedance associated with the selected antenna to control the impedance matching circuit 114. This allows impedance matching between the transmitter or receiver 112 and the selected antenna 116.

Figure 4:
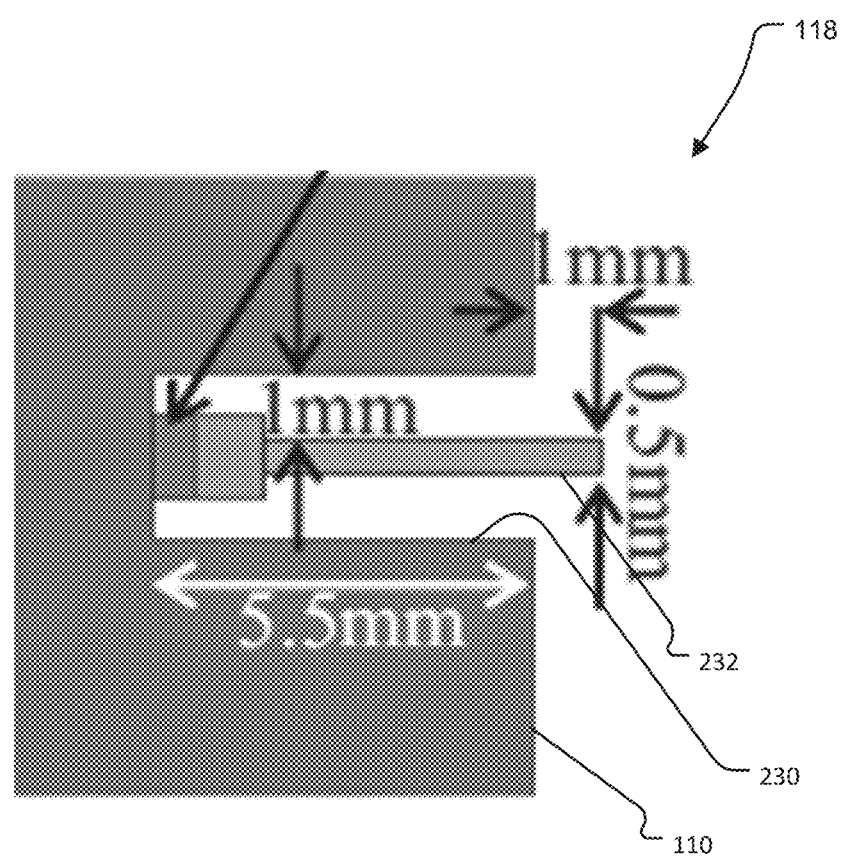
FIG. 4 is a schematic cross-section of an E field probe.

FIG. 4 shows one example of an E field probe 118. The probe 118 is set in a well 230 in the vehicle's fuselage 13. In the example, the well is 5.5 millimeter (mm) deep and is circular with a diameter of about 2.5 mm. A probe element 232 is supported at the bottom of the well and extends outward down the center of the well 230 and projects about 1 mm beyond the mouth of the well 230 and past the surface of the fuselage 13.

While this invention has been particularly shown and described with references to preferred embodiments thereof, it will be understood by those skilled in the art that various changes in form and details may be made therein without departing from the scope of the invention encompassed by the appended claims.

What is claimed is:

1. A communication system for a hypersonic vehicle, the system comprising:
    a distributed antenna system; and
    a control system selectively connects a transmitter and/or receiver to one or more of the antennas based upon the antennas that are seeing the most favorable transmission or reception characteristics through a plasma sheath surrounding the hypersonic vehicle.

2. The system of claim 1, wherein the distributed antenna system comprises antennas distributed over the hypersonic vehicle.

3. The system of claim 2, wherein each of the antennas conforms to an outer surface of a surface of the hypersonic vehicle.

4. The system of claim 2, wherein the antennas are located on a nose portion and fuselage of the hypersonic vehicle.

5. The system of claim 1, further comprising an impedance matching circuit that provides impedance matching between the transmitter and/or receiver and the selected one or more antennas and a surrounding plasma sheath.

6. The system of claim 1, further comprising near-field probes to determine impedance of a plasma sheath adjacent to each of the probes and thus predict behavior of the respective antennas near the probes.

7. The system of claim 6, further comprising an impedance matching circuit that provides impedance matching between the transmitter and/or receiver and the selected one or more antennas, wherein the controller controls the impedance matching circuit based on information from the near-filed probes.

8. A communication system for a hypersonic vehicle, the system comprising:
    a distributed antenna system comprising antennas distributed over the hypersonic vehicle;
    a control system selectively connects a transmitter and/or receiver to one or more of the antennas based upon the antennas that are seeing the most favorable transmission or reception characteristics,
    wherein each of the antennas includes a feed line and one or more resonators surrounding the feed line.

9. A method for providing a communication system for a hypersonic vehicle, the method comprising:
    determining which antennas distributed over the hypersonic vehicle are seeing the most favorable transmission or reception characteristics; and selectively connecting a transmitter and/or receiver of the hypersonic vehicle to those one or more the antennas to transmit or receive information, wherein each of the antennas includes a feed line and one or more resonators surrounding the feed line.

10. The method of claim 9, wherein each of the antennas conforms to an outer surface of a surface of the hypersonic vehicle.

11. The method of claim 10, wherein the antennas are located on a nose portion and fuselage of the hypersonic vehicle.

12. The method of claim 9, further comprising impedance matching between the transmitter and/or receiver and the selected one or more antennas and a surrounding plasma sheath.

13. The method of claim 9, further comprising determining impedance of a plasma sheath adjacent to each of the antennas and impedance matching based on the determined impedance.

14. A communication system for a hypersonic vehicle, the system comprising:
   a distributed antenna system; and
   a control system selectively connects a transmitter and/or receiver to one or more of the antennas based upon the antennas that are seeing the most favorable transmission or reception characteristics, wherein the distributed antenna system comprises ten or more separate antennas that are distributed around a fuselage of the vehicle, the antennas being located on portions of the fuselage where, due to aerodynamics, a plasma sheath will be thin or nonexistent at least during portions of a hypersonic flight of the vehicle.

15. A communication system for a hypersonic vehicle, the system comprising:
   a distributed antenna system; and
   a control system selectively connects a transmitter and/or receiver to one or more of the antennas based upon the antennas that are seeing the most favorable transmission or reception characteristics, wherein the distributed antenna system comprises separate antennas, each antenna comprising metal layers for a feed line, resonators, and a ground plane patch to form a flexible antenna assembly that is conformal and shaped to a curve of an outer surface of a fuselage of the vehicle.

16. A communication system for a hypersonic vehicle, the system comprising:
   a distributed antenna system;
   a control system selectively connects a transmitter and/or receiver to one or more of the antennas based upon the antennas that are seeing the most favorable transmission or reception characteristics; and
   near-field probes to determine impedance of a plasma sheath adjacent to each of the probes and thus predict behavior of the respective antennas near the probes, wherein the near-field probes are set in wells a fuselage of the vehicle, wherein the wells are several millimeters deep and have a diameter of several millimeters, with probe elements supported at bottoms of the wells and extending down centers the wells and projecting beyond mouths of the wells and a surface of the fuselage.

* * * * *